US011060288B2

(12) United States Patent
Kalkanoglu et al.

(10) Patent No.: US 11,060,288 B2
(45) Date of Patent: Jul. 13, 2021

(54) METHOD OF PRODUCING ROOFING SHINGLES WITH ENHANCED GRANULE ADHESION

(71) Applicant: CertainTeed LLC, Malvern, PA (US)

(72) Inventors: Husnu M. Kalkanoglu, Swarthmore, PA (US); Keith C. Hong, Lititz, PA (US); Joong Youn Kim, Newtown Square, PA (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 14/288,828

(22) Filed: May 28, 2014

(65) Prior Publication Data

US 2014/0287166 A1    Sep. 25, 2014

Related U.S. Application Data

(62) Division of application No. 11/469,655, filed on Sep. 1, 2006, now abandoned.

(51) Int. Cl.
| | |
|---|---|
| *E04D 5/12* | (2006.01) |
| *B32B 37/24* | (2006.01) |
| *E04D 1/20* | (2006.01) |
| *D06N 5/00* | (2006.01) |
| *E04D 1/00* | (2006.01) |

(52) U.S. Cl.
CPC ............... *E04D 5/12* (2013.01); *B32B 37/24* (2013.01); *D06N 5/00* (2013.01); *E04D 1/20* (2013.01); *B32B 2037/243* (2013.01); *B32B 2315/085* (2013.01); *B32B 2395/00* (2013.01); *B32B 2419/06* (2013.01); *E04D 2001/005* (2013.01)

(58) Field of Classification Search
CPC .......... B32B 2037/243; B32B 2395/00; B32B 2419/06; B32B 37/24; B32B 2037/24; D06N 5/00; E04D 1/20; E04D 2001/005; E04D 1/12; E04D 5/12; E04D 1/00; C03C 2218/117; C23C 18/1287
USPC ........................................ 427/186, 346, 600
See application file for complete search history.

(56) References Cited

U.S. PATENT DOCUMENTS

| | | | | |
|---|---|---|---|---|
| 2,332,219 | A | * | 10/1943 | Harshberger .......... C08G 12/40 106/284.02 |
| 2,591,149 | A | | 4/1952 | Grove |
| 2,614,051 | A | | 10/1952 | Buzzell et al. |
| 2,798,822 | A | * | 7/1957 | Carter .................... E04D 11/02 427/186 |
| 2,898,232 | A | | 8/1959 | Miller et al. |
| 2,981,636 | A | | 4/1961 | Lodge et al. |
| 3,974,303 | A | * | 8/1976 | Iwase .................... B05D 3/067 427/185 |
| 4,036,661 | A | | 7/1977 | Schmidt et al. |

(Continued)

FOREIGN PATENT DOCUMENTS

| | | |
|---|---|---|
| EP | 1918416 A1 | 5/2008 |
| FR | 2670506 A1 | 6/1992 |

(Continued)

*Primary Examiner* — Philip C Tucker
*Assistant Examiner* — Jimmy R Smith, Jr.
(74) *Attorney, Agent, or Firm* — McDonnell Boehnen Hulbert & Berghoff LLP

(57) ABSTRACT

The retention of roofing granules on bituminous roofing products is enhanced by providing an adherent material in the interstices between the exterior surface of the roofing granules and the exposed upper surface of the base sheet.

20 Claims, 3 Drawing Sheets

(56) References Cited

U.S. PATENT DOCUMENTS

| | | | |
|---|---|---|---|
| 4,234,639 A | | 11/1980 | Graham |
| 4,292,882 A | * | 10/1981 | Clausen .................... B32B 5/28 |
| | | | 109/49.5 |
| 4,314,042 A | * | 2/1982 | Goto .................... C09D 129/04 |
| | | | 427/181 |
| 4,371,568 A | * | 2/1983 | von Tell .................... B05D 1/30 |
| | | | 118/101 |
| 4,378,408 A | | 3/1983 | Joedicke |
| 4,478,869 A | | 10/1984 | Brady et al. |
| 4,895,754 A | | 1/1990 | Graham et al. |
| 5,180,240 A | * | 1/1993 | Gueret .................... A45D 33/00 |
| | | | 401/200 |
| 5,380,552 A | * | 1/1995 | George .................... D06N 5/00 |
| | | | 427/186 |
| 5,411,803 A | | 5/1995 | George et al. |
| 5,427,793 A | * | 6/1995 | Bigham ................. A01N 55/04 |
| | | | 424/404 |
| 5,456,785 A | | 10/1995 | Venable |
| 5,620,554 A | | 4/1997 | Venable |
| 5,643,399 A | | 7/1997 | Venable |
| 5,723,516 A | | 3/1998 | Bigham et al. |
| 6,036,777 A | * | 3/2000 | Sachs .................... B05C 19/04 |
| | | | 118/120 |
| 6,143,318 A | | 11/2000 | Gilchrist et al. |
| 6,174,360 B1 | | 1/2001 | Silwinski et al. |
| 6,245,850 B1 | | 6/2001 | Fields |
| 6,296,912 B1 | | 10/2001 | Zickell |
| 6,355,309 B1 | | 3/2002 | Fleming et al. |
| 6,426,309 B1 | | 7/2002 | Miller et al. |
| 6,502,360 B2 | | 1/2003 | Carr, III et al. |
| 6,521,038 B2 | | 2/2003 | Yanagimoto et al. |
| 6,531,200 B2 | | 3/2003 | Zickell et al. |
| 6,703,127 B2 | | 3/2004 | Davis et al. |
| 6,758,019 B2 | | 7/2004 | Kalkanoglu et al. |
| 7,059,800 B2 | | 6/2006 | Jones et al. |
| 7,125,601 B1 | | 10/2006 | Pinault et al. |
| 7,241,500 B2 | | 7/2007 | Shiao et al. |
| 7,294,404 B2 | | 11/2007 | Krisko et al. |
| 7,387,839 B2 | | 6/2008 | Gueneau et al. |
| 7,452,598 B2 | | 11/2008 | Shiao et al. |
| 7,510,763 B2 | | 3/2009 | Gueneau et al. |
| 7,815,977 B2 | | 10/2010 | Besson et al. |
| 7,976,909 B2 | | 7/2011 | Durandeau et al. |
| 8,349,435 B2 | | 1/2013 | Shiao et al. |
| 9,534,293 B2 | | 1/2017 | Besson et al. |
| 2002/0028361 A1 | | 3/2002 | Biore et al. |
| 2002/0160151 A1 | | 10/2002 | Pinault et al. |
| 2003/0060569 A1 | | 3/2003 | White et al. |
| 2003/0068469 A1 | | 4/2003 | Aschenbeck et al. |
| 2003/0152747 A1 | * | 8/2003 | Fensel .................... B32B 5/16 |
| | | | 428/143 |
| 2004/0255548 A1 | | 12/2004 | Hong et al. |
| 2004/0258835 A1 | | 12/2004 | Hong et al. |
| 2005/0053745 A1 | | 3/2005 | Bartek et al. |
| 2005/0053746 A1 | | 3/2005 | Bartek |
| 2005/0072110 A1 | * | 4/2005 | Shiao .................... E04D 5/12 |
| | | | 52/741.1 |
| 2005/0072114 A1 | | 4/2005 | Shiao et al. |
| 2005/0074580 A1 | | 4/2005 | Gross et al. |
| 2005/0197248 A1 | | 9/2005 | Ohtsu et al. |
| 2006/0003651 A1 | | 1/2006 | Grube et al. |
| 2006/0014050 A1 | | 1/2006 | Gueneau et al. |
| 2006/0110996 A1 | | 5/2006 | Gelichtermann et al. |
| 2007/0054129 A1 | | 3/2007 | Kalkanoglu et al. |
| 2007/0054557 A1 | | 3/2007 | Kalkanoglu et al. |
| 2007/0092734 A1 | | 4/2007 | Durandeau et al. |
| 2007/0148340 A1 | | 6/2007 | Kalkanoglu et al. |
| 2007/0148342 A1 | | 6/2007 | Kalkanoglu et al. |
| 2008/0008832 A1 | | 1/2008 | Shiao et al. |
| 2008/0026161 A1 | | 1/2008 | Frings et al. |
| 2008/0038513 A1 | | 2/2008 | Grube et al. |
| 2008/0107820 A1 | | 5/2008 | Gabelnick et al. |
| 2008/0115444 A1 | | 5/2008 | Kalkanoglu et al. |
| 2008/0160188 A1 | * | 7/2008 | Teng .................... B05D 1/30 |
| | | | 427/186 |
| 2009/0075067 A1 | | 3/2009 | Myli et al. |
| 2009/0075069 A1 | | 3/2009 | Myli et al. |
| 2009/0105407 A1 | * | 4/2009 | Karjala .................... C08F 10/00 |
| | | | 524/547 |

FOREIGN PATENT DOCUMENTS

| | | |
|---|---|---|
| FR | 2857030 A1 | 1/2005 |
| WO | 9710186 A1 | 3/1997 |
| WO | 03087002 A1 | 10/2003 |
| WO | 2005007286 A1 | 1/2005 |
| WO | 2006049865 A1 | 5/2006 |

* cited by examiner

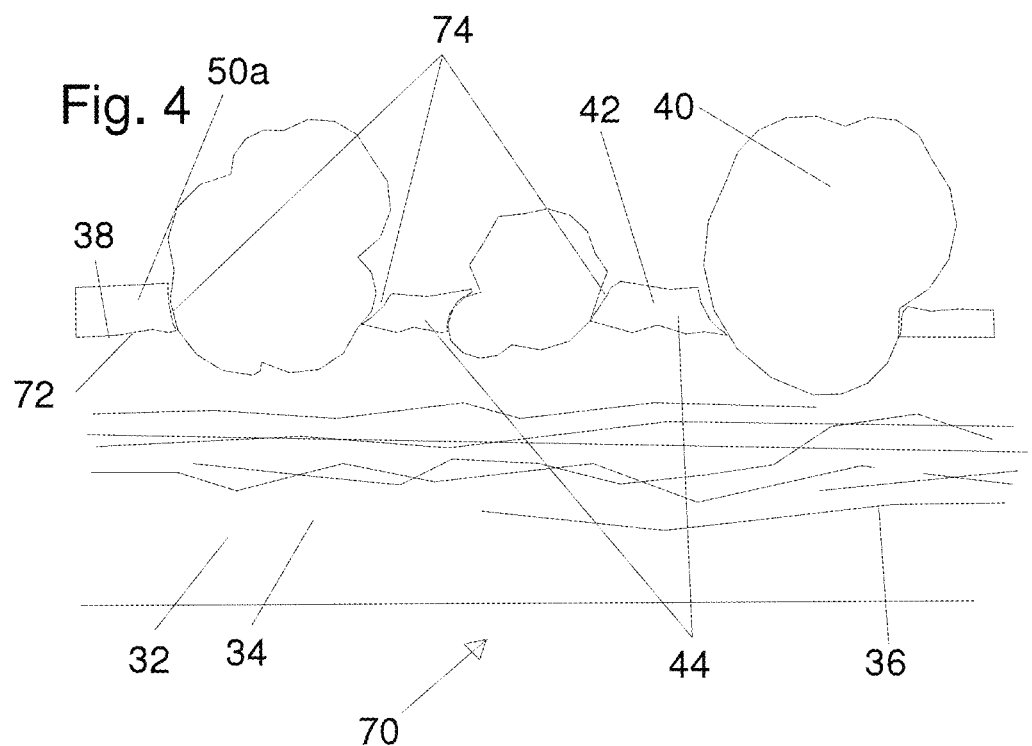
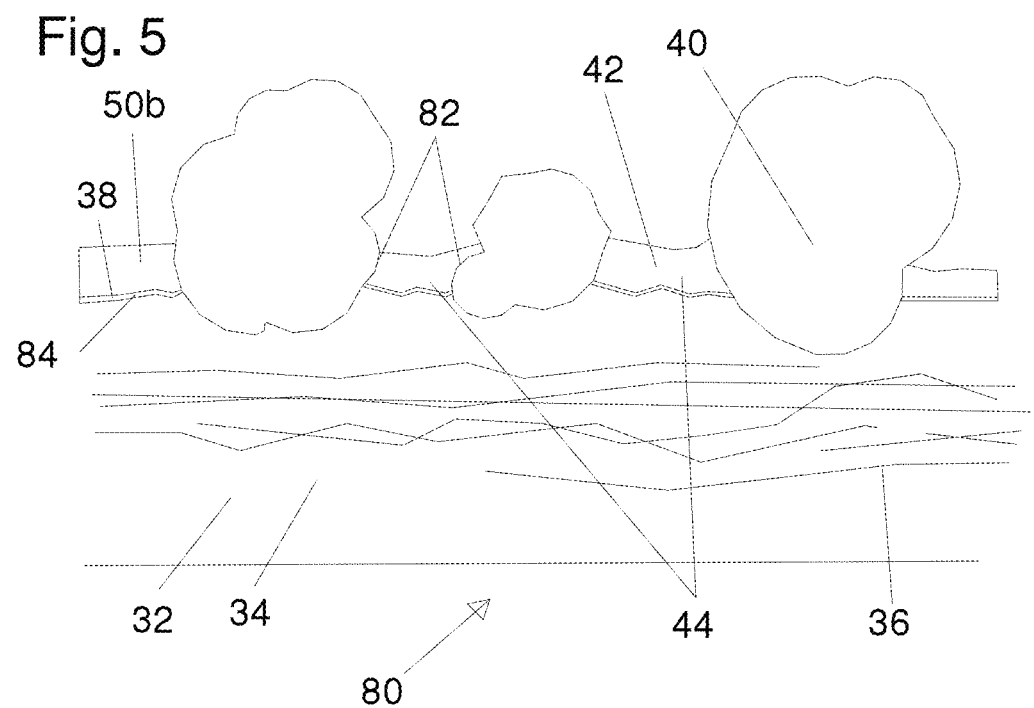

METHOD OF PRODUCING ROOFING SHINGLES WITH ENHANCED GRANULE ADHESION

CROSS-REFERENCE TO RELATED APPLICATION

The present application is a division of pending U.S. application Ser. No. 11/469,655 filed Sep. 1, 2006.

BACKGROUND OF THE INVENTION

1. Field of the Invention

The present invention relates to asphalt roofing shingles and membranes, and protective granules for such shingles, and processes for makings such granules and shingles.

2. Brief Description of the Prior Art

Roofing granules are generally used in asphalt shingles or in roofing membranes to protect asphalt from harmful ultraviolet radiation and to add aesthetic values to a roof. Typically, roofing granules are produced by using inert mineral particles that are colored by pigments, clay, and alkali metal silicate binders in the processes as described by the U.S. Pat. Nos. 2,981,636, 4,378,408, 5,411,803, or 5,723,516.

Roofing granules are typically applied to at least a portion of the upper surface of asphalt shingles or roofing membranes. In the manufacture of asphalt shingles, for example, a continuous web of a reinforcing material such as glass fibers is coated with a layer of a hot, fluid bituminous material, and the roofing granules are dropped in a predefined pattern onto the upper surface of the coated web while the bituminous material is still soft. The web passes around a roller, which serves to press the roofing granules into the layer of bituminous material. Subsequently, the resulting granule-coated web is cut into shingles, which typically include at least a portion covered with granules. When the shingles are installed on a roof, the shingles are overlapped.

The principal utilitarian function of the roofing shingles is to waterproof the roof. This function is provided by the bituminous material, which is subject to degradation from exposure to the elements over the life of the roof. As the roof ages, eventually the integrity of the shingles is compromised—cracks can develop in the bituminous layer, and water may enter the roof through the damaged shingles. The roofing granules help extend the effective working life of the shingles by shielding the upper surface of the bituminous layer from damaging ultraviolet radiation, impact damage caused by hail, etc. Nevertheless, because the granules are typically irregularly shaped, it is not possible to completely cover the entire upper surface of the bituminous layer when the shingles are manufactured. Instead, a small portion of the upper surface of the bituminous layer remains uncovered. During the service life of the shingle, the uncovered upper surface of the bituminous layer is exposed to the elements, and eventually begins to degrade. In time, enough of the bituminous layer is weakened or degraded so that the mechanical bond of individual granules to the bituminous layer is lost, and granules separate from the shingle surface. Because shingles are typically installed on pitched roofs, the force of water running down the shingles helps dislodge poorly adhered granules and washes them off the roof. The loss of granules exposes an additional portion of the underlying bituminous layer to the elements, accelerating the environmental degradation process and shortening the working life of the roof.

U.S. Pat. No. 6,426,309 discloses a storm proof roofing material formed from an asphalt coated substrate such as a nonwoven web of glass fibers. The upper surface of the asphalt coating is in turn covered with a layer of a protective coating, using an adhesive material such as flexible ethylene vinyl-acetate copolymer, ethylene vinyl-acetate copolymer modified with styrene-butadiene-styrene block copolymer, or tackified polyethylene. The resulting roofing material shows improved impact resistance, which should correlate with improved resistance to hailstones.

There is a continuing need for improved roofing materials with extended working lives, and a process for preparing them.

SUMMARY OF THE INVENTION

The present invention advantageously provides a process for preparing roofing products having an extended service life, as well as a process for enhancing the retention of roofing granules on bituminous roofing products. In addition, the present invention provides improved roofing products having an extended service life.

In one aspect, the present process provides roofing products having an extended service life, and comprising embedding roofing granules having an exterior surface in a bituminous base sheet having an upper surface. The roofing granules are embedded in the upper surface of the bituminous base sheet, and the base sheet has an exposed upper surface extending between the partially embedded roofing granules. In another aspect, the present invention provides a process for enhancing the retention of roofing granules on bituminous roofing products, such as roofing products that have already been installed on roofs.

The present process includes providing an adherent material between the exterior surface of the roofing granules and the exposed upper surface of the base sheet, and processing the adherent material to secure the roofing granules to the base sheet. Preferably, the roofing granules are mineral particles, which preferably range from about #8 to #50 US mesh in size.

In a first embodiment of the process of the present invention, the adherent material preferably comprises a polymeric powder, which preferably comprises a polymer selected from the group consisting of polyethylene, polyolefins, acid-containing polyolefins, ethylene vinyl acetate, acrylics, ethylene-alkyl acrylate copolymers, polyvinylbutyral, polyurethane and mixtures thereof. Preferably, the polymeric powder has a particle size of from about 1 micrometer to 400 micrometers, and more preferably from about 20 micrometers to 200 micrometers. The adherent material can further include at least one additive selected from the group consisting of tackifiers, wetting agents, thermal stabilizers, UV stabilizers, algaecides, and solar reflection agents.

Preferably, the adherent material is provided between the exterior surface of the roofing granules and the upper surface of the base sheet by depositing an adherent polymeric powder on the upper surface of bituminous base sheet in which roofing granules are embedded; and subjecting the base sheet to mechanical oscillation to assist in lodging the adherent powder mixture on the exterior surface of the granules sheet and on the upper surface of the base sheet. Preferably, the mechanical oscillation is provided ultrasonically. In this embodiment of the present process, processing the adherent material to secure the roofing granules to the base sheet preferably includes melting the polymeric powder to form a coating. Preferably, in this embodiment of the present process the polymeric powder is processed to form a coating using energy provided by a source selected from the group consisting of heat lamp, open flame, UV radiation, microwave radiation, gyrotron beam radiation, and electron beam radiation and combinations thereof. It is preferred that the coating be translucent or transparent. In one aspect of the present embodiment, the granules are preferably embedded in the bituminous base sheet and the base sheet is cut into individual shingles before the polymeric powder is provided between the exterior surface of the roofing granules and the upper surface of the base sheet. In another aspect of the present embodiment, the polymeric powder is provided before the base sheet is cut into individual shingles.

In a second embodiment of the process of the present invention, the adherent material comprises a fluid adhesive. In this embodiment, an adherent material is provided between the exterior surface of the roofing granules and the upper surface of the base sheet by applying the fluid adhesive to the upper surface of the base sheet in which the roofing granules are embedded to form a coating. In the embodiment, the processing the adherent material to secure the roofing granules to the base sheet comprises curing the coating of the fluid adhesive. In this embodiment of the process of the present invention, the granules are preferably embedded in the bituminous base sheet and the base sheet is cut into individual shingles before the adherent material is provided between the exterior surface of the roofing granules and the upper surface of the base sheet. Further, it is preferred that the fluid adhesive be applied to the upper surface of the base sheet in which the roofing granules are embedded to form a discontinuous coating. Preferably, the fluid adhesive comprises a polymer selected from the group consisting of polyethylene, polyolefins, acid-containing polyolefins, ethylene vinyl acetate, ethylene-alkyl acrylate copolymers, polyvinylbutyral, acrylics, polyurethanes and mixtures thereof. It is preferred that the fluid adhesive be applied by a method selected from the group consisting of spraying, rolling, curtain coating, extrusion coating and brushing. Preferably, the fluid adhesive has a solids content of from about 10 percent to 90 percent by weight, and more preferably from about 20 percent to 50 percent. It is also preferred that the cured coating be translucent or transparent. Preferably, the coating is cured by a curing method selected from the group consisting of thermal means, chemical means and radiation means. Preferably, the thickness of the cured coating is from 12 micrometers to 50 micrometers. Preferably, the cured coating comprises from about 0.01 percent to 1.0 percent by weight of the total weight of the roofing product. In one aspect of the present embodiment, the granules are preferably embedded in the bituminous base sheet and the base sheet is cut into individual shingles before the fluid adhesive is provided between the exterior surface of the roofing granules and the upper surface of the base sheet. In another aspect of the present embodiment, the fluid adhesive is provided before the base sheet is cut into individual shingles. In yet another aspect, the fluid adhesive is provided after the shingles have been installed on a roof.

In a third embodiment of the process if the present invention, the adherent material comprises a polymeric web, and the adherent material is provided between the exterior surface of the roofing granules and the upper surface of the base sheet by applying the polymeric web to the upper surface of the base sheet in which the roofing granules are embedded. In this third embodiment processing the adherent material to secure the roofing granules to the base sheet comprises heating the polymeric web to cause the polymeric material to flow and form a coating covering at least a portion of the exterior surface of the roofing granules and at least a portion of the upper surface of the base sheet. Preferably, the polymeric web is translucent or transparent. Preferably, the polymeric web is a web material comprising a polymer selected from the group consisting of polyethylene, polyolefins, acid-containing polyolefins, ethylene vinyl acetate, ethylene-alkyl acrylate copolymers, polyvinylbutyral, acrylics, polyurethane, and mixtures thereof. Preferably, the polymeric web has a thickness of from about 12 micrometers to 50 micrometers. Preferably, the polymeric web comprises from about 0.01 percent to 1.0 percent by weight of the total weight of the roofing product. It is preferred that the polymeric web be in a form selected from the group consisting of continuous film, woven mat, nonwoven mat, mesh, netting, and scrim. In this third embodiment of the process of the present invention, the polymer web is preferably heated by application of an external heat source. In one aspect of the present embodiment, the granules are preferably embedded in the bituminous base sheet and the base sheet is cut into individual shingles before the polymeric web is provided between the exterior surface of the roofing granules and the upper surface of the base sheet. In another aspect, of the present embodiment, the polymeric web is provided before the base sheet is cut into individual shingles. In yet another aspect, the polymeric web is provided after the shingles have been installed on a roof.

In yet another embodiment, the present invention provides a process for enhancing the retention of roofing granules on a preexisting bituminous roofing product, such as a roof covered with asphalt shingles. In this case, the bituminous roofing product comprises roofing granules having an exterior surface and a bituminous base sheet having an upper surface, and the roofing granules are embedded in the upper surface of the bituminous base sheet. The base sheet has an exposed upper surface extending between the partially embedded roofing granules. In this embodiment, the process comprises providing an adherent material between the exterior surface of the roofing granules and the exposed upper surface of the base sheet; and processing the adherent material to secure the roofing granules to the base sheet. Preferably, in this embodiment, the adherent material comprises a fluid adhesive, and an adherent material is provided between the exterior surface of the roofing granules and the upper surface of the base sheet by applying the fluid adhesive to the upper surface of the base sheet in which the roofing granules are embedded to form a coating. In this case processing the adherent material to secure the roofing granules to the base sheet comprises curing the coating of the fluid adhesive. Preferably, the fluid adhesive comprises a polymer selected from the group consisting of polyethylene, polyolefins, acid-containing polyolefins, ethylene vinyl acetate, ethylene-alkyl acrylate copolymers, polyvinylbutyral, acrylics, polyurethanes and mixtures thereof. Preferably, the fluid adhesive is applied by a method selected from the group consisting of spraying, rolling, and brushing.

The present invention also provides an improved bituminous roofing product having enhanced retention of roofing granules. The roofing product of the present invention includes a bituminous base sheet having an upper surface, and roofing granules partially embedded in the upper surface of the bituminous base sheet and having an exterior surface protruding from the base sheet, and an interior surface embedded within and in contact with bituminous base sheet. The base sheet has an exposed upper surface extending between the partially embedded roofing granules. The roofing product further includes an adherent material extending between the exterior surface of the roofing granules and the exposed upper surface of the base sheet. Preferably, the adherent material comprises a polymer selected from the group consisting of polyethylene, polyolefins, acid-containing polyolefins, ethylene vinyl acetate, ethylene-alkyl acrylate copolymers, polyvinylbutyral, acrylics, polyurethane and mixtures thereof and forms a coating at least partially covering the exterior surface of the roofing granules and the exposed upper surface of the base sheet. Preferably, the adherent material further comprises at least one additive selected from the group consisting of tackifiers, wetting agents, thermal stabilizers, UV stabilizers, algaecides, and solar reflection agents. In one embodiment of the improved roofing product of the present invention, the coating of the adherent material is discontinuous. In another embodiment of the improved roofing product of the present invention, the coating of the adherent material forms net-like, physically porous layer.

BRIEF DESCRIPTION OF THE FIGURES

FIG. 4 is an enlarged, fragmentary schematic sectional view of an improved roofing product according to the present invention.

FIG. 5 is an enlarged, fragmentary schematic sectional view of an improved roofing product according to the present invention.

DETAILED DESCRIPTION

The present invention advantageously provides a process for preparing roofing products having an extended service life, as well as a process for enhancing the retention of roofing granules on bituminous roofing products. The present invention also provides improved roofing products having an extended service life.

The process of the present invention can be employed during the manufacture of new roofing products, such as asphalt shingles, roll roofing, and the like, in which roofing granules are applied during manufacture. In addition, the process of the present invention can be employed to treat existing roofs to extend their service lives.

The process of the present invention provides several approaches for use to ensure that roofing granules remain properly situated on the asphalt surfaces after prolonged exposure to natural outdoor environment.

In one embodiment of the process of the present invention, polymeric powders are sprinkled or deposited onto the shingles' upper surfaces. The shingles are then placed on a vibratory stage or table to allow the powdery materials settling into the crevices among the granules.

Figure 1:
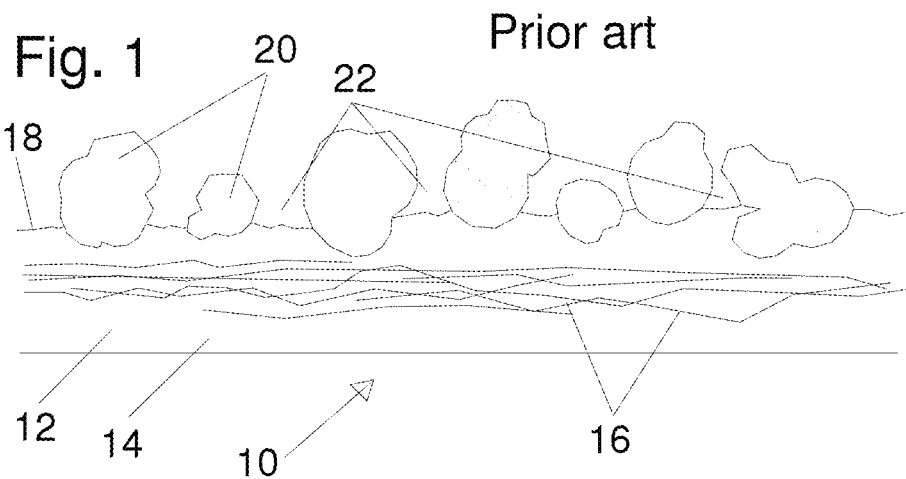
FIG. 1 is a schematic sectional view of a roofing product of the prior art.

Referring now to the drawings, in which like reference numerals refer to like elements in each of the several views, there are shown in the schematic sectional view of FIG. 1 a roofing product 10 of the prior art. The prior art roofing product 10 includes a base sheet 12 comprising a bituminous material 14 reinforced for mechanical strength with a wholly embedded glass fiber web 16. On the upper surface 18 of the base sheet 12, a plurality of irregularly shaped roofing granules 20 are partially embedded in the bituminous material 14. Because the roofing granules 20 are irregularly shaped, they cannot pack to cover the entire upper surface 18 of the base sheet 12. Instead, there are a plurality of gaps 22 in between the roofing granules 20.

In the process of the present invention, roofing granules are embedded in the upper surface of a bituminous base sheet, thus providing, at an intermediate step in the process, an intermediate roofing product having a structure similar to the prior art roofing product illustrated in FIG. 1.

Figure 2:
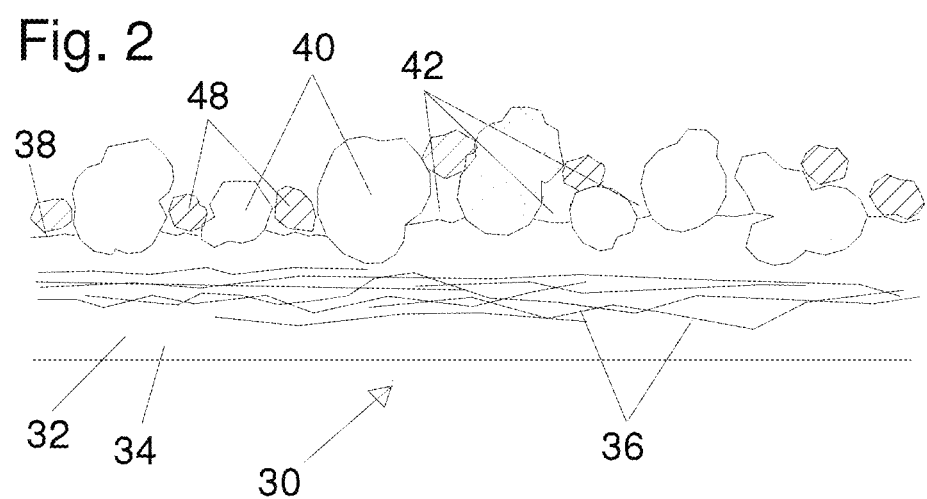
FIG. 2 is a schematic sectional view of a roofing product being prepared according to the process of the present invention, shown after an intermediate step in the process.
Figure 3:
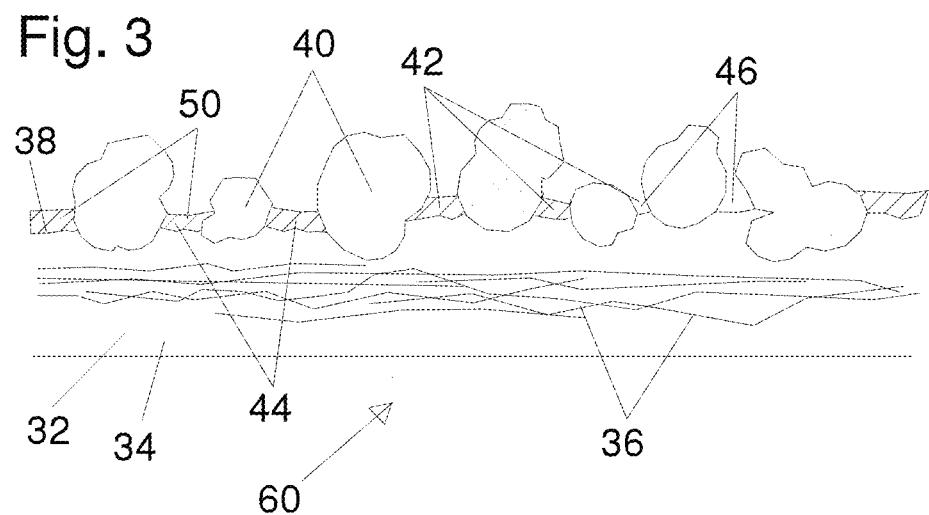
FIG. 3 is a schematic sectional view of an improved roofing product according to the present invention.

An intermediate roofing product 30 provided in one presently preferred embodiment of the process of the present invention, is shown in the schematic sectional view of FIG. 2. The intermediate roofing product 30 includes a base sheet 32 including bituminous material 34 reinforced with a glass fiber web 36 that is completed embedded within the bituminous material 34 of the base sheet 32. A plurality of irregularly shaped roofing granules 40 are partially embedded in the upper surface 38, having a surface area A, of the base sheet 32, providing gaps 42 in between the roofing granules 40 such that a portion B of the upper surface 38 of the base sheet 32 is exposed by the gaps 42 to the environment, while another portion C of the upper surface 38 of the base sheet 32 is covered by the roofing granules 40. In this first embodiment of the process of the present invention, a polymeric material powder is sprinkled or otherwise deposited on the upper surface of the intermediate roofing product 30, and the roofing product 30 is mechanically agitated to allow the particles 48 of polymeric material powder to settle into the gaps 42 between the embedded roofing granules 40, such as is shown schematically in FIG. 2. Preferably, the average particle size of the polymeric powder material particles 48 is less than the width of the gaps 42 so that the particles 48 tend to become lodged in the gaps 42. Subsequently, the upper surface of the intermediate roofing product 30 is heated to a temperature greater than that of the melting point of the polymeric powder material particles 48 so that the polymeric material melts and flows into the gaps 42. Subsequently, the intermediate roofing product 30 is permitted to cool to form a final roofing product 60 according to the present invention, such as is shown in the schematic sectional view of FIG. 3. In the final roofing product 60, the polymeric material 50 fills some of the gaps 44 in between the roofing granules 40, and covering a surface area D of the upper surface 38 of the base sheet 32. However, other gaps 46 have not been filled with the polymeric material 50, such that a small portion E of the upper surface 38 of the base sheet 32 continues to be exposed to the environment. Preferably, the ratio of the surface area E that remains exposed to the environment to the total surface area B of the upper surface of the base sheet 32 covered initially by the gaps 42 between the roofing granules 40 is less than about 0.10, and more preferably less than about 0.05.

Preferably the adherent material is a polymeric material selected from the group consisting of polyethylene, polyolefins, acid-containing polyolefins, ethylene vinyl acetate, ethylene-alkyl acrylate copolymers, polyvinylbutyral, acrylics, polyurethane and mixtures thereof.

The polymeric material can also include additives such as tackifiers, wetting agents, ultraviolet stabilizers, and the like.

The polymeric material is preferably applied at a loading of from about 0.1 weight percent to 5 weight percent of the total weight of the roofing product, and more preferably at a loading of from about 0.3 weight percent to 1 weight percent of the total weight of the roofing product.

It is believed that the surface energy of the bituminous surface of the base sheet is less than the surface energy of the roofing granules, which are conventionally coated with metal oxide colored pigment particles embedded in a siliceous binder. It is believed that the bituminous surface is generally hydrophobic and the surface of the roofing granules is generally hydrophilic.

Preferably, the surface energy of the polymeric material is such that the polymeric material adheres at least to the bituminous surface of the base sheet. In this case, provision of the adherent material enhances the service life of the roofing product by helping to mechanically lock the generally irregularly shaped roofing granules to the surface of the roofing product. This aspect of the present invention is illustrated in the enlarged schematic sectional view of FIG. 4, which shows an improved roofing product 70 prepared according to a process of the present invention, such as according to the process of the first embodiment discussed above. In this aspect of the present invention, the polymeric material 50a strongly adheres to the upper surface 38 of the base sheet 32 at their interface 72, while the polymeric material 50a does not adhere to the surface of the roofing granules 40 when the polymeric material powder particles melt and flow into the gaps 42, creating small gaps 74 between the surface of the roofing granules 40 and the polymer materiel 50a when the polymer material 50a solidifies. In the present aspect, even though the polymeric material 50a does not strongly bond to the surface of the roofing granules 40, the edges of the solidified polymeric material 50a surrounding the roofing granules 40 tend to mirror the irregular shape of the roofing granules 40 and thus serves to mechanically lock the roofing granules 40 in place. In addition, the polymeric material 50a tends to shield the underlying upper surface 38 of the base sheet 32 from environmental degradation, thus extending the service life of the roofing product 70.

Another aspect of the present invention is illustrated in the enlarged schematic elevational view of FIG. 5, which shows an improved roofing product 80 prepared according to a process of the present invention, such as according to the process of the first embodiment discussed above. However, in this aspect of the present invention, surface energy of the polymeric material 50b is less than the surface energy of the roofing granules 40, but greater than the surface energy of the upper surface 38 of the base sheet 32. Thus, the polymeric material 50b strongly adheres to the surface of the roofing granules 40 at their interface 82 when the polymeric material powder particles melt and flow into the gaps 42, but does not strongly adhere to the upper surface 38 of the base sheet 32, creating small gaps 84 between the surface of the base sheet 32 and the polymeric materiel 50b when the polymeric material solidifies. In the present aspect, the polymeric material 50b bonds to the surface of the roofing granules 40, such that even though a specific roofing granule 40 (not shown) may have lost adhesion to the underlying base sheet 32, that specific roofing granule will likely be securely bonded through the polymeric material 50b to other roofing granules 40 which continue to be embedded within and to adhere to the upper surface 38 of the base sheet 32, thus serving to mechanically lock the specific roofing granule 40 in place. As in the first aspect discussed above, the polymeric material 50b also tends to shield the underlying upper surface 38 of the base sheet 32 from environmental degradation, thus extending the service life of the roofing product 80.

The roofing granules themselves may be prepared so that they include at least two different surface area zones with differing surface energies, with at least one such zone having a surface energy chosen to permit the polymeric material to bond to that surface area zone.

Preferably, the surface energy of the polymeric material is such that the polymeric material adheres to both the surface of the roofing granules and to the surface of the bituminous base sheet in which the roofing granules are embedded.

In one embodiment of the process of the present invention, the adherent material is a polymeric powder. The polymeric powder preferably has an average particle size less than the average gap between the roofing granules on the roofing product to which the polymeric powder is to be applied. Preferably, the average particle size of the polymeric powder is between about 1 micrometer and 400 micrometers, and more preferably from about 20 micrometers to 200 micrometers.

Preferably, the polymeric powder fuses at a temperature of from between 66 degrees C. (150 degrees F.) to 204 degrees C. (400 degrees F.), and more preferably from about 93 degrees C. (200 degrees F.) to 149 degrees C. (300 degrees F.). Preferably, the resulting film coating comprises from about 0.01 weight percent to 1 weight percent of the total weight of the roofing products.

In second embodiment of process of the present invention, the adherent material comprises a fluid adhesive. In this embodiment the adherent material is provided between the exterior surface of the roofing granules and the upper surface of the base sheet by applying the fluid adhesive to the upper surface of the base sheet in which the roofing granules are embedded to form a coating. In this embodiment, processing the adherent material to secure the roofing granules to the base sheet comprises curing the coating of the fluid adhesive. In this embodiment of the process of the present invention, the fluid adhesive can be introduced by spraying, rolling, curtain coating or brushing technique. The fluid adhesive can be either a water-based adhesive such as a polymeric latex adhesive, or solvent-based adhesive, such as polymeric material dissolved in a suitable solvent. Alternatively, the fluid adhesive can be a substantially 100% non-volatile adhesive, such as a radiation curable adhesive or a two part reactive adhesive. The adherent material preferably includes a polymeric material selected from the group consisting of polyethylene, polyolefins, acid-containing polyolefins, ethylene vinyl acetate, ethylene-alkyl acrylate copolymers, polyvinylbutyral, acrylics, acrylates, polyurethane and mixtures thereof.

Preferably, the solids content of the fluid adhesive employed to form the coating ranges from 10% to 90% by weight, more preferably between 20% to 50%.

Upon curing or drying (via thermal, chemical or radiation means), the fluid adhesive preferably becomes a thin film coating covering the shingle surface. Preferably, the resulting cured or dried film of adherent material has a thickness of about 12 micrometers (0.5 mils) to 50 micrometers (2 mils). Preferably, the resulting film coating comprises from about 0.01 weight percent to 1 weight percent of the total weight of the roofing products. Preferably, the resulting film coatings are either clear or transparent, and do not substantially modify the physical appearance of the roofing product, or any other significant properties of the roofing products.

The fluid adhesive needs not cover the entire shingle surface. Local dewetting can occur such that gaps in the cured or dried adhesive film occur, or, alternatively, the fluid adhesive can be applied using a contact or non-contact coating applicator adapted to provide a predefined pattern on the surface of the roofing material.

In a third embodiment of the process of the present invention, the adherent material comprises a polymeric web, and the adherent material is provided between the exterior surface of the roofing granules and the upper surface of the base sheet by applying the polymeric web to the upper surface of the base sheet in which the roofing granules are embedded. In this embodiment, processing the adherent material to secure the roofing granules to the base sheet comprises heating the polymeric web to cause the polymeric material to flow and form a coating covering at least a portion of the exterior surface of the roofing granules and at least a portion of the upper surface of the base sheet. The process of this third embodiment is analogous to laminating the shingles, in that an external heat source can be employed to soften and melt the polymeric web in-situ.

In one aspect of the process of this third embodiment, the granules are embedded in the bituminous base sheet and the base sheet is cut into individual shingles before the adherent material is provided between the exterior surface of the roofing granules and the upper surface of the base sheet.

Preferably, the polymeric web is translucent or transparent. Preferably, the polymeric web is a web material comprising a polymer selected from the group consisting of polyethylene, polyolefins, acid-containing polyolefins, ethylene vinyl acetate, ethylene-alkyl acrylate copolymers, polyvinylbutyral, acrylics, polyurethane, and mixtures thereof.

Preferably, the polymeric web has a thickness of from about 12 micrometers to 50 micrometers. It is preferred that the polymeric web comprises from about 0.01 percent by weight to 1.0 percent by weight of the total weight of the roofing product.

Preferably, the polymeric web is in a physical form selected from the group consisting of continuous films, a continuous films having opening formed therein, woven mats, nonwoven mats, meshes, netting, and scrims.

Preferably, the polymer web is heated by application of an external heat source.

The present invention also provides an improved bituminous roofing product having enhanced retention of roofing granules. The improved roofing product of the present invention comprises a bituminous base sheet having an upper surface, as well as roofing granules partially embedded in the upper surface of the bituminous base sheet and having an exterior surface protruding from the base sheet. In the improved roofing product of the present invention, the base sheet has an exposed upper surface extending between the partially embedded roofing granules and an interior surface embedded within and in contact with bituminous base sheet. The improved roofing product of the present invention also includes an adherent material extending between the exterior surface of the roofing granules and the exposed upper surface of the base sheet.

Because the adherent material applied according to the process of the present invention after the roofing granules have become embedded in the upper surface of bituminous base sheet, the adherent material does not extend between the interior surface of the roofing granules and the base sheet, in contrast to the storm-proof roofing products prepared as disclosed in U.S. Pat. No. 6,426,309 in which the bituminous base sheet is coated with an adhesive material before the roofing granules are applied to the base sheet so-coated.

Preferably, the adherent material comprises a polymer selected from the group consisting of polyethylene, polyolefins, acid-containing polyolefins, ethylene vinyl acetate, ethylene-alkyl acrylate copolymers, polyvinylbutyral, acrylics, polyurethane and mixtures thereof.

Preferably, the adherent material forms a coating at least partially covering the exterior surface of the roofing granules and the exposed upper surface of the base sheet.

Preferably, the adherent material further includes at least one additive selected from the group consisting of tackifiers, wetting agents, thermal stabilizers, UV stabilizers, algaecides, and solar reflection agents.

In one aspect of the improved roofing product of the present invention, the coating of the adherent material is discontinuous.

In another aspect of the improved roofing product of the present invention, the coating of the adherent material forms net-like, physically porous layer.

Preferably, the adherent material is selected and applied such that the physical and mechanical attributes of roofing product are not significantly adversely affected by the provision of the adherent material.

Examples of algaecides that can be employed in the adherent material include various organic biocides, such as hexahydro-1,3,5-tris(2-hydroxyethyl)-s-triazine, hexahydro-1,3,5-triethyl-s-triazine, 2-(tert-butylamino)-4-chloro-6-(ethylamino)-S-triazine, tetrahydro-3,5-dimethyl-2H-1,3,5-thiadiazine-2-thione, 3-iodo-2-propylbutyl carbamate, sodium dimethyldithiocarbamate, disodium ethylene bisdithiocarbamate, disodium cyanodithioimidocarbamate, potassium N-methyldithiocarbamate, potassium dimethyldithiocarbamate, 2,2-dibromo-3-nitrilopropionamide, 2,2-dibromo-2-nitroethanol, 2-bromo-2-nitro-1,3-propanediol, 4,5-dichloro-2-n-octyl-4-isothiazolin-3-one, 2-methyl-2,3-dihydroisothiazol-3-one 5-chloro-2-methyl-4-isothiazolin-3-one, 2-n-octyl-4-isothiazolin-3-one, chloroallyl-3,5,7-azoniaadamantane chloride, tetrakishydroxymethyl phosphonium sulfate, poly[oxyethylene (dimethyliminio)ethylene-(dimethliminio)ethylene dichloride], didecyl dimethyl ammonium chloride, and dodecylguanidine hydrochloride and mixtures thereof. A mixture of 2-n octyl-4-isothiazolin-3-one, methylbenzimidazole-2-yl carbamate, and N'-(3,4 dichlorophenyl)-N-N-dimethylurea is one example of preferred algaecidal cocktails.

Examples of solar reflection materials that can be employed in the adherent material include nano-sized (20-150 nm particle size) metal oxides such as iron oxides, zinc oxide, titanium oxides, to name a few.

The roofing granules employed in the processes of the present invention can be prepared through traditional granule preparation methods, such as those disclosed in U.S. Pat. No. 2,981,636, incorporated herein by reference. Such roofing granules are typically prepared from core particles coated with one or more layers of coating materials. The core particles are typically chemically inert materials, such as inert mineral particles. Suitable mineral particles can be produced by a series of quarrying, crushing, and screening operations, are generally intermediate between sand and gravel in size (that is, between about #8 US mesh and #70 US mesh). The core particles can have an average particle size of from about 0.2 mm to about 3 mm, and more preferably from about 0.4 mm to about 2.4 mm. In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled manufactured materials such as crushed bricks, concrete, porcelain, fire clay, and the like.

In preparing roofing granules for use in the process of the present invention, intermediate or base particles can be formed by coating the inert core particles with a first or inner coating composition to form a first or inner layer on the inert core particles, and to thus encapsulate the inert core particles, followed by a second or outer coating composition to form a second or other layer over the first or inner layer. The inner coating composition can optionally include at least one first algaecidal material, and preferably includes a suitable coating binder. The second or outer layer preferably includes at least one metal oxide pigment to impart a predetermined color to the roofing granule, as well as a suitable coating binder. Alternatively, the inner coating can be omitted, and the core particle can be coated with a single layer of coating composition, preferably including at least one metal oxide pigment. The coating binder can be an inorganic or organic material, and is preferably formed from a polymeric organic material or a silicaceous material, such as a metal-silicate binder, for example an alkali metal silicate, such as sodium silicate.

When a metal-silicate binder is employed in the preparation of roofing granules of the present invention, the binder preferably includes a heat-reactive aluminosilicate material, such as clay, preferably, kaolin. Alternatively, the metal silicate binder can be insolubilized chemically by reaction with an acidic material, for example, ammonium chloride, aluminum chloride, hydrochloric acid, calcium chloride, aluminum sulfate, and magnesium chloride, such as disclosed in U.S. Pat. Nos. 2,591,149, 2,614,051, 2,898,232 and 2,981,636, each incorporated herein by reference, or other acidic material such as aluminum fluoride. In another alternative, the binder can be a controlled release sparingly water soluble glass such as a phosphorous pentoxide glass modified with calcium fluoride, such as disclosed in U.S. Pat. No. 6,143,318, incorporated herein by reference. The coated mineral particles are typically cured by a heat treatment to obtain a durable or coating. When the coated mineral particles are fired at an elevated temperature, such as at least 800 degrees C., and preferably at 1,000 to 1,200 degrees C., the clay binder densifies to form strong particles.

Examples of clays that can be employed in the process of the present invention include kaolin, other aluminosilicate clays, Dover clay, bentonite clay, etc.

In the alternative, a suitable silicaceous binder can be formed from sodium silicate, modified by the addition of sodium fluorosilicate, aluminum fluoride, and Portland cement.

The improved process employed to manufacture the roofing products of the present invention can employ conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. Conventional roofing granules, algae-resistant roofing granules, or mixtures of conventional roofing granules with algae-resistant roofing granules can be employed, and the roofing granules can be embedded in the surface of such bituminous roofing products using conventional methods.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products.

The bituminous material used in manufacturing roofing products according to the present invention is derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following example is illustrative of the processes and articles of the present invention, and will be useful to those of ordinary skill in the art in practicing the invention. However, the invention is in no way limited by this example. Unless otherwise indicated all percentages are given on a weight basis in the following example.

EXAMPLE

Figure 6:
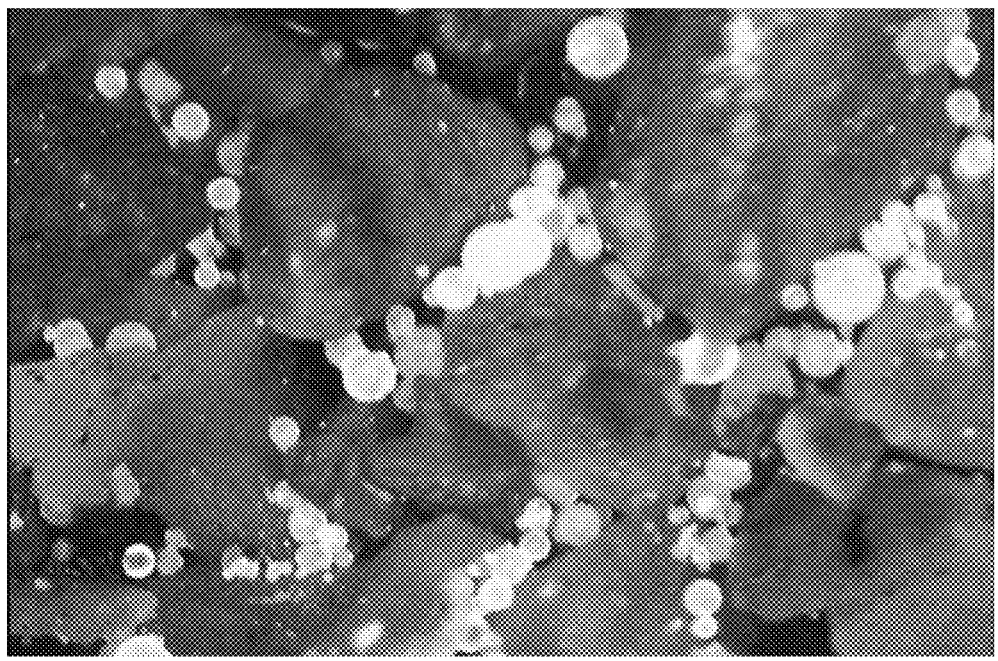
FIG. 6 is a micrograph of the upper surface of a roofing shingle to which a polymeric powder has been applied according to a process of the present invention.
Figure 7:
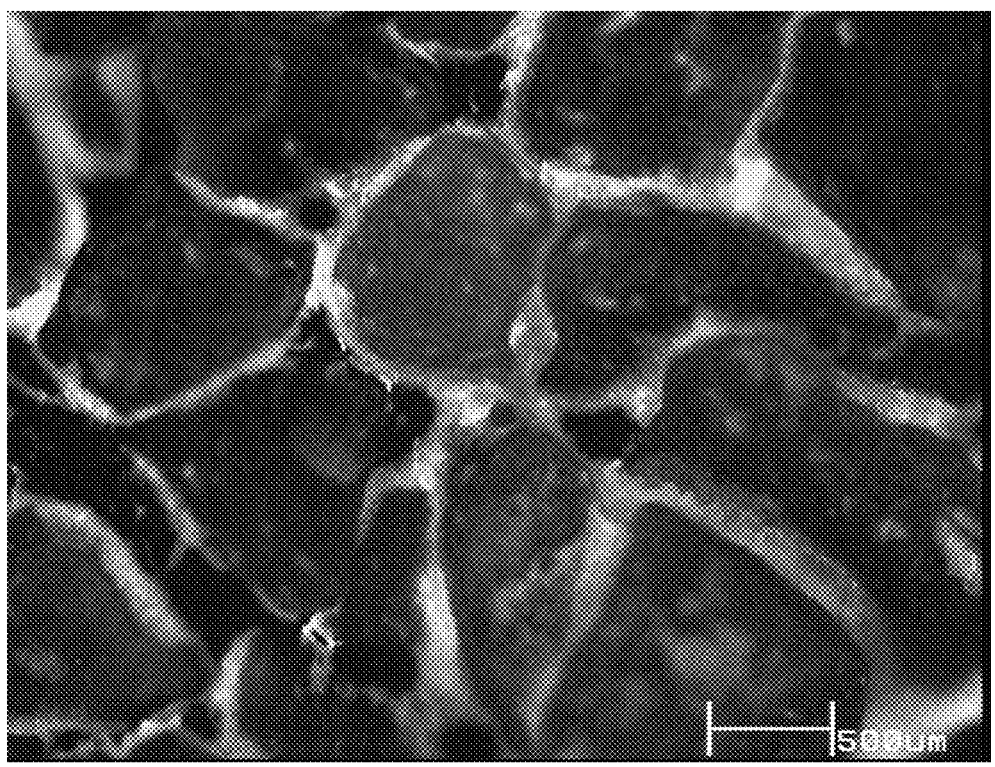
FIG. 7 is a micrograph of the upper surface of the roofing shingle of FIG. 6 taken after the polymeric powder had been fused by application of heat pursuant to a process of the present invention.

A high-density polyethylene powder (THP polyethylene wax supplied by ISCOM, Austin, Tex.) was selected for application according to the present process. This polymer has a molecular weight of 2,000 g/mole, melting point of 122° C. and 87% crystallinity. The polyethylene powder was sprinkled on the upper surface of a conventional asphalt roofing shingle having a bituminous base surfaced with conventional colored roofing granules at a loading of 30 g of polyethylene powder per square meter. The treated shingle, as shown in the micrograph of FIG. 6, was then shaken to allow the powder to settle into the crevices between the roofing granules. FIG. 6, the larger dark-color particles are roofing granules, and the smaller white particles surrounding the roofing granules are polymer powder before melting. Subsequently, the assembly is exposed to a heat lamp at 130° C. to convert the powder into a thin film around the granules, as shown in the micrograph of FIG. 7. In FIG. 7, the polymer powder particles have melted to form translucent polymeric films around the roofing granules. Other heating sources (open flame or similar heating devices) or radiation (UVI electron beam) can also be used. The film did not noticeably alter either the color or the physical and mechanical properties of the original unmodified shingle.

Various modifications can be made in the details of the various embodiments of the processes and articles of the present invention, all within the scope and spirit of the invention and defined by the appended claims.

The invention claimed is:

1. A process for enhancing the retention of roofing granules on a bituminous roofing product, the process comprising:
    (a) embedding roofing granules having exterior surfaces in a bituminous base sheet having an upper surface, the roofing granules being embedded in the upper surface of the bituminous base sheet and comprising partially embedded roofing granules, the roofing granules extending above the upper surface of the base sheet, the base sheet having an exposed upper surface extending between the partially embedded roofing granules; then
    (b) after embedding the roofing granules in the bituminous base sheet, depositing an adherent material comprising an adherent thermoplastic polymer powder having a particle size from about 1 micrometer to about 400 micrometers on the exposed upper surface of the base sheet between the exterior surfaces of the partially embedded roofing granules, wherein the adherent thermoplastic polymer powder is added to the base sheet when the base sheet is at a temperature less than that of a melting point of the adherent thermoplastic polymer powder, and wherein the adherent material does not include any solar reflective additive; then
    (c) subjecting the base sheet to mechanical oscillation to assist in lodging the adherent thermoplastic polymer powder between the exterior surfaces of the partially embedded roofing granules on the exposed upper surface of the base sheet; and then
    (d) heating the upper surface of the base sheet to melt the adherent thermoplastic polymer powder to form the bituminous roofing product comprising the bituminous base sheet, the roofing granules embedded in the exposed upper surface of the bituminous base sheet, and a continuous thermoplastic polymer coating disposed between the exterior surfaces of the partially embedded roofing granules on the exposed upper surface of the base sheet, the polymer coating disposed on the exposed upper surface of the base sheet not extending to upper surfaces of the roofing granules above the base sheet, to secure the roofing granules to the base sheet while leaving the upper surfaces of the granules exposed.

2. A process according to claim 1 wherein the roofing granules are mineral particles, the mineral particles ranging from about #8 to about #50 US mesh.

3. A process according to claim 1 wherein the adherent thermoplastic polymer powder is selected from the group consisting of powders of polyethylene, polyolefins, acid-containing polyolefins, ethylene vinyl acetate, acrylics, ethylene-alkyl acrylate copolymers, polyvinylbutyral, polyurethane and mixtures thereof, the polymer powder making up from about 0.01 percent to 1.0 percent by weight of the total weight of the roofing product.

4. A process according to claim 3 wherein the adherent material further comprises at least one additive selected from the group consisting of tackifiers, wetting agents, thermal stabilizers, and algaecides.

5. A process according to claim 1, wherein the mechanical oscillation is provided ultrasonically.

6. A process according to claim 1, wherein the melting of the adherent thermoplastic polymer powder is performed using energy provided by a source selected from the group consisting of heat lamp, open flame, UV radiation, microwave radiation, and electron beam radiation and combinations thereof.

7. A process according to claim 6 wherein the polymer coating is translucent or transparent.

8. A process according to claim 1, wherein the ratio of the surface area of the upper surface of the bituminous base sheet that remains exposed, after said step of melting the adherent thermoplastic polymer powder to secure the roofing granules to the base sheet, to the total area of the exposed upper surface of the bituminous base sheet extending between the partially embedded roofing granules before deposition of the thermoplastic polymer powder is less than about 0.10.

9. A process according to claim 1, wherein the ratio of the surface area of the bituminous upper surface of the base sheet that remains exposed, after said step of melting the adherent thermoplastic polymer powder to secure the roofing granules to the base sheet, to the total surface area of the exposed bituminous upper surface of the base sheet extending between the partially embedded roofing granules before deposition of the thermoplastic polymer powder is less than about 0.05.

10. The process of claim 1, wherein the mechanical oscillation is performed while upper surfaces of the granules are exposed.

11. The process of claim 1, wherein the roofing granules have an outer surface from a siliceous binder.

12. The process of claim 1, wherein the thermoplastic polymer powder fuses at a temperature from about 93° C. to about 149° C.

13. The process of claim 1, wherein the adherent material consists of the thermoplastic polymer powder; or consists of the thermoplastic polymer powder and one or more additives selected from the group consisting of tackifiers, wetting agents, thermal stabilizers, and UV stabilizers.

14. A process for enhancing the retention of roofing granules on a bituminous roofing product, the process comprising:
    (a) embedding roofing granules having exterior surfaces in a bituminous base sheet having an upper surface, the roofing granules being embedded in the upper surface of the bituminous base sheet and comprising partially embedded roofing granules, the base sheet having an exposed upper surface extending between the partially embedded roofing granules; then
    (b) depositing an adherent material comprising an adherent thermoplastic polymer powder on the exposed upper surface of the base sheet between the exterior surfaces of the partially embedded roofing granules, wherein the adherent material does not include any solar reflective additive; then (c) subjecting the base sheet to mechanical oscillation to assist in lodging the adherent thermoplastic polymer powder between the exterior surfaces of the partially embedded roofing granules on the exposed upper surface of the base sheet; and then (d) heating the upper surface of the base sheet to melt the adherent thermoplastic polymer powder to form the bituminous roofing product comprising the bituminous base sheet, the roofing granules embedded in the exposed upper surface of the bituminous base sheet, and a continuous thermoplastic polymer coating disposed between the exterior surfaces of the partially embedded roofing granules on the exposed upper surface of the base sheet to secure the roofing granules to the base sheet while leaving the upper surfaces of the granules exposed.

15. The process according to claim 14, wherein the adherent material consists of the thermoplastic polymer powder; or consists of the thermoplastic polymer powder and one or more additives selected from the group consisting of tackifiers, wetting agents, thermal stabilizers, and UV stabilizers.

16. The process according to claim 14, wherein the adherent thermoplastic polymer powder is selected from the group consisting of powders of polyethylene, polyolefins, acid-containing polyolefins, ethylene vinyl acetate, acrylics, ethylene-alkyl acrylate copolymers, polyvinylbutyral, polyurethane and mixtures thereof, the polymer powder comprising from about 0.01 percent to 1.0 percent by weight of the total weight of the base sheet, the granules, and the adherent material.

17. The process according to claim 14, wherein the mechanical oscillation is provided ultrasonically.

18. The process according to claim 14, wherein the ratio of the surface area of the upper surface of the bituminous base sheet that remains exposed, after said step of melting the adherent thermoplastic polymer powder to secure the roofing granules to the base sheet, to the total area of the exposed upper surface of the bituminous base sheet extending between the partially embedded roofing granules before deposition of the thermoplastic polymer powder is less than about 0.10.

19. The process according to claim 14, wherein the mechanical oscillation is performed while upper surfaces of the granules are exposed.

20. The process according to claim 14, wherein the thermoplastic polymer powder fuses at a temperature from about 93° C. to about 149° C.

* * * * *